United States Patent

Graffagno et al.

[11] Patent Number: 5,170,147
[45] Date of Patent: Dec. 8, 1992

[54] ALARM DEVICE FOR THE PROTECTION OF CATALYTIC CONVERTERS FOR THE EXHAUST GASES OF ENDOTHERMIC MOTORS AND VEHICLE PROVIDED WITH SUCH A DEVICE

[75] Inventors: Gianni Graffagno, Genova; Enzo Dughera, Beinasco, both of Italy

[73] Assignee: Fiat Auto S.p.A., Italy

[21] Appl. No.: 632,155

[22] Filed: Dec. 21, 1990

[30] Foreign Application Priority Data

Dec. 22, 1989 [IT] Italy ............................ 68176 A/89

[51] Int. Cl.⁵ .......................................... B60Q 1/00
[52] U.S. Cl. ................................. 340/449; 340/438; 60/277
[58] Field of Search ............... 340/438, 449, 590, 592, 340/593, 595; 60/277, 282, 285, 286

[56] References Cited

U.S. PATENT DOCUMENTS

| | | | |
|---|---|---|---|
| 3,440,817 | 4/1969 | Saufferer | 60/284 |
| 3,812,401 | 5/1974 | Radin | 60/277 X |
| 3,838,569 | 10/1974 | Reck | 340/593 X |
| 3,851,469 | 12/1974 | Eichler et al. | 60/285 X |
| 3,896,616 | 7/1975 | Keith et al. | 60/274 |
| 4,023,359 | 5/1977 | Masaki et al. | 60/277 |
| 4,024,850 | 5/1977 | Peter et al. | 60/277 X |
| 4,188,623 | 2/1980 | Suzuki et al. | 340/595 |
| 4,484,548 | 11/1984 | Sugasawa et al. | 60/277 X |

FOREIGN PATENT DOCUMENTS

| | | |
|---|---|---|
| 236659 | 9/1987 | European Pat. Off. . |
| 2193416 | 2/1974 | France . |
| 2199802 | 4/1974 | France . |

*Primary Examiner*—Donnie L. Crosland
*Attorney, Agent, or Firm*—Quarles & Brady

[57] ABSTRACT

An alarm device is described which can be installed in vehicles equipped with a catalytic exhaust muffler, to protect the same from overheating due to an excess of unburnt substances in the exhaust gases; the device consists of a second catalytic converter arranged upstream from the exhaust muffler along the exhaust pipe, and provided on the inside with a temperature sensor; when the temperature of the second converter exceeds a predetermined threshold, this is signalled by the sensor, possibly to an engine control system.

5 Claims, 1 Drawing Sheet

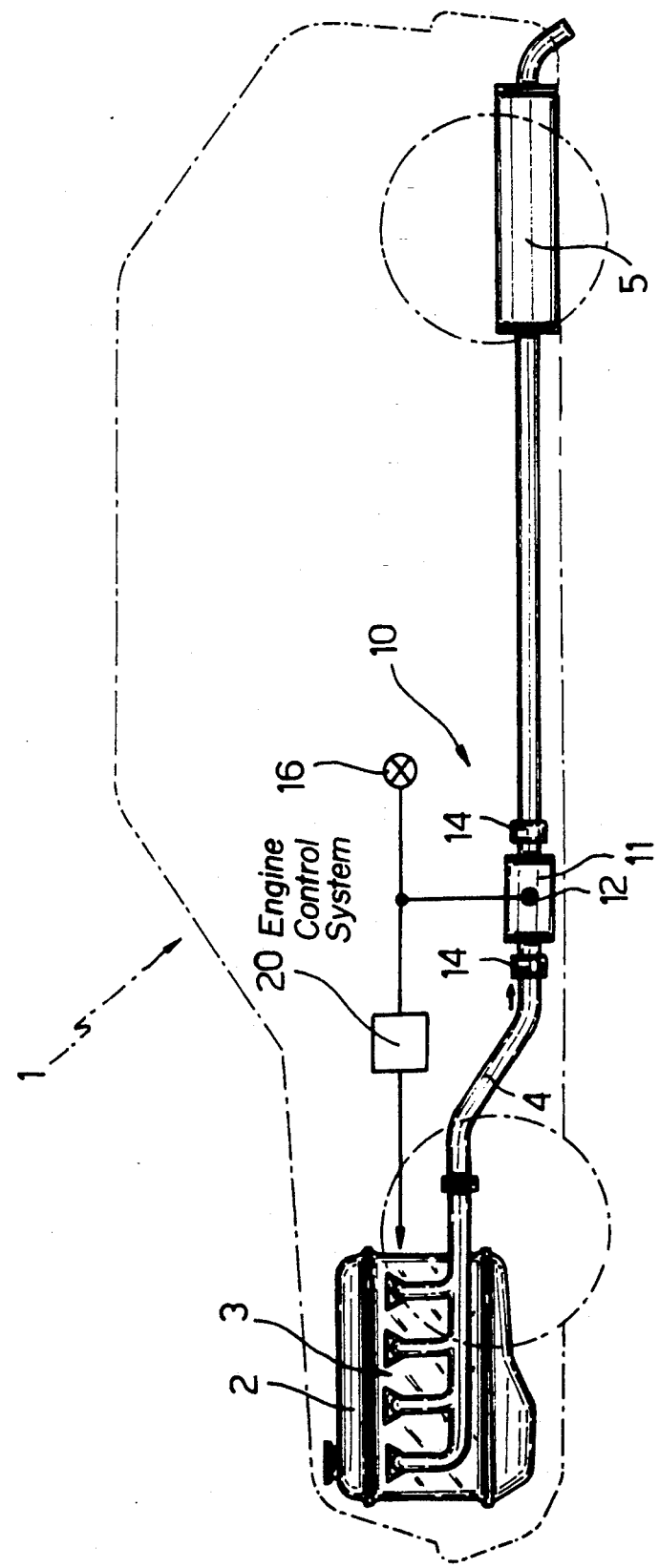

ALARM DEVICE FOR THE PROTECTION OF CATALYTIC CONVERTERS FOR THE EXHAUST GASES OF ENDOTHERMIC MOTORS AND VEHICLE PROVIDED WITH SUCH A DEVICE

BACKGROUND OF THE INVENTION

The present invention relates to an alarm device for protecting from overheating one or more catalytic converters mounted in series along an exhaust pipe of an internal combustion engine, for conveying the exhaust gases produced by the engine, and consequently freeing them of the noxious substances. The invention also relates to a vehicle equipped with a catalytic exhaust muffler and such an alarm device.

It is known that for ecological purposes vehicles may be equipped with one or more catalytic converters connected to the exhaust pipe of the engine of the vehicle (normally in series), through which are carried the exhaust gases from the engine, before they are discharged into the atmosphere. The known catalytic converters consist usually of exhaust mufflers (which possibly also perform the function of additional silencer), which are so-called "catalytic" mufflers, consisting of a leak-tight casing housing a support (ceramic, for example), on which is dispersed a suitable catalyst (platinum or platinum compounds, for example), capable of eliminating the noxious substances contained in the exhaust gases (essentially unburnt hydrocarbons, carbon monoxide and nitrous oxides), favouring the partial or total oxidation of the same.

Since oxidation, as is well known, is a highly exothermic chemical reaction, the temperature of the catalyst rises during the operation of the engine in proportion to the quantity of noxious substances to be oxidised and present in the exhaust gases. Therefore, if the engine produces an excess quantity of unburnt substances, there is a risk that the catalyst will be overheated to a temperature sufficient to cause the same to deteriorate. Consequently the catalytic converter may be irreparably damaged insofar as the overheating of the catalyst may lead to partial or total inactivation of the same.

SUMMARY OF THE INVENTION

The object of the invention is to provide a simple, economic alarm device capable of detecting the presence of a dangerous concentration of unburnt substances in the exhaust gases to be cleaned before the temperature in the catalytic converter used for cleaning the same is able to reach values which are dangerous for the catalyst.

The said object is achieved by the invention, which relates to an alarm device for protecting from overheating at least one primary catalytic converter mounted along an exhaust pipe of an internal combustion engine, for conveying the exhaust gases of the engine, characterised in that it comprises at least one secondary catalytic converter installed in series along the said exhaust pipe of the engine upstream, in relation to the course of the exhaust gases, from the primary catalytic converter, and a temperature sensor supported by the said secondary catalytic converter, and capable of detecting the internal temperature of the same.

BRIEF DESCRIPTION OF THE DRAWING

For a clearer understanding of the invention, a non-exhaustive description is given one of one of its embodiments, with reference to the attached drawing, which illustrates diagrammatically, in blocks, a vehicle equipped with an engine with a catalytic converter and with an alarm device constructed according to the invention.

DETAILED DESCRIPTION OF THE INVENTION

The figure in the attached drawing denotes by 1 a vehicle of any known type equipped with an engine 2, whose exhaust manifold 3 is connected hydraulically via exhaust pipe 4, so that it is leak tight, to a primary catalytic converter 5, which in the embodiment consists of a catalytic muffler of any known type capable of freeing, by oxidation, a flow of exhaust gases produced by engine 2, denoted by the arrow, of any noxious substances present in them, essentially totally or partially unburnt hydrocarbons (or other combustible substances), carbon monoxide and nitrous oxides. The catalytic converter or muffler 5, whose internal structure is not illustrated, for the sake of simplicity, since it is well known, is simply indicated by a block, and consists of a casing in which is housed a support (ceramic or metal, for example) on which are arranged a suitable oxidation catalytic converter and possibly adsorbent substances capable of trapping and converting to oxidised, non-toxic products, the aforementioned noxious substances that may be present in the exhaust gases; the latter are then discharged freely into the atmosphere, immediately downstream from catalytic muffler 5, or after passing through a second muffler or silencer, known and not illustrated, for the sake of simplicity.

According to the invention vehicle 1 is equipped with an alarm device denoted in the complex by 10, capable of protecting catalytic converter 5 from overheating, quickly indicating the possible presence of an excessive concentration of unburnt substances in the exhaust gases of engine 2. This device 10 comprises, according to the invention, one (or more than one) secondary catalytic converter 11, installed in series along exhaust pipe 4, hydraulically upstream, in relation to the course of the exhaust gases denoted by the arrow, from primary catalytic converter 5, and a temperature sensor 12 supported by secondary catalytic converter 11, or arranged in its promixity and supported by the body of vehicle 1, which sensor 12 is capable of detecting the internal temperature of secondary catalytic converter 11. The latter exhibits dimensions substantially smaller than those of primary catalytic converter 5, to be protected, and consists essentially of a miniature catalytic muffler, identical in all respects to 5, except for the dimensions and the quantity of catalyst contained in it, and obviously considerably smaller; in particular, the dimensions and cleaning capacity of catalytic converter 11 are selected so that there are no excessive load losses along pipe 4, and so that there is substantial cleaning of the flow of exhaust gases produced by engine 2 before the flow reaches primary converter 5. The catalyst present inside converter 11 should preferably be of the same chemical nature as that present in converter 5 to be protected.

According to a further characteristic of the invention, device 10 may also comprise respective joints 14, known, capable of allowing the rapid connection/disconnection of converter 11 on exhaust pipe 4, preferably in an area of pipe 4 arranged underneath the floor of vehicle 1, and indicators of any kind, for example optical indicators 16 arranged inside the interior of vehicle 1, for example on the instrument panel visible to the driver, to which temperature sensor 12, consisting essentially of a thermocouple of any known type, is connected so that the indicators light up when a predetermined temperature is exceeded inside secondary catalytic converter 11.

Sensor 11 may possibly be connected instead of indicators 16, or indicators other than these, to a known control and command system 20 of engine 2, consisting for example of a microprocessor system for simultaneous control of the respective electronic ignition and injection systems of engine 2, known and not illustrated for the sake of simplicity. This system 20 is capable, when a predetermined temperature is exceeded inside secondary catalytic converter 11, signalled by sensor 12, to vary the operating parameters of engine 2 so as to reduce the emission of unburnt substances, possibly also to the detriment of the performances (power, torque) of the same engine.

The operation of alarm device 10 is simple. Secondary catalytic converter 11, although not being capable of appreciably cleaning the flow of burnt gases produced by engine 2, given its reduced dimensions and power, always determines the oxidation of a minimum quantity of the unburnt substances and the other noxious substances contained in the gaseous flow which crosses it, and consequently its temperature, when engine 2 is running, rises above that of the burnt gases, due to the effect of the esothermicity of the oxidation reactions which take place in it; given the reduced dimensions of converter 11, as well as the small number of oxidation reactions which take place in it, which as already mentioned are insufficient to clean the flow of burnt gases appreciably, it is sufficient to raise the internal temperature of converter 11, in this case appreciably; this rise in temperature may therefore be continuously measured by sensor 12.

It will also be realised that by suitably dimensioning converter 11 it is possible to ensure that the rise in temperature which it undergoes as a result of the passage of the exhaust gases through it, is identical, or at least proportional, to that which converter 5 undergoes when it is crossed by the same flow of exhaust gases. In fact the concentration of oxidisable substances present in the flow of exhaust gases is not, in the first approximation, varied by the passage across converter 11. Therefore converter 11 is capable of acting as a miniature model of converter 5, a model in which are found, in anticipation of converter 5 (either because converter 11 is located upstream from the latter in relation to the course of the exhaust gases crossing the former, or because it is smaller, and therefore exhibits a lower thermal inertia), the same physico-chemical conditions which, in the absence of appreciable variations in the composition of the exhaust gases, can then be found in converter 5 during cleaning.

Therefore, in the case of a concentration of unburnt substances beyond the dangerous limit (or beyond the limit which would increase the temperature of converter 5 to a value dangerous as far as its integrity is concerned), the temperature in converter 11 attains the danger value well before this can can be reached by converter 5, the dangerous temperature is detected by sensor 12, and gives rise (where, for example, this dangerous value of the temperature is chosen as the threshold for activation of optical indicating means 16 and/or system 20) to the activation of means 16 and/or system 20. The user, warned by means 16, may therefore switch off engine 2 before converter 5 even reaches a temperature which is dangerous for the catalyst, thereby sparing the catalytic muffler of the vehicle, which is an extremely expensive component, and may therefore contribute towards better regulation and control of engine 2. If system 20 is provided, the damage to catalytic muffler 5 may be avoided even without switching off engine 2, insofar as system 20 intervenes in a known manner to cause an immediate reduction in the concentration of unburnt substances in the exhaust gases, as a result of which muffler 5, thanks to its thermal inertia, cannot reach a dangerous temperature or, at most, reaches it only in the transitory phase, without the catalyst suffering damage. Any intervention of signalling (indicating) means 16 will, however, warn the user that a defective (dangerous) system has been detected.

It is clear that if means 16 and/or system 20 are activated, it is because converter 11 has reached a dangerous temperature for the catalyst; therefore, as a result of such activation, the deactivation of converter 11 may also occur; in this case it may be appropriate to provide more than one secondary converter 11, so that if one is damaged the other (or others) take its place as sensors until the damaged converter is replaced. Any replacement is therefore simple and rapid, and must be carried out on a section of pipe 4 normally arranged underneath the floor of vehicle 1, or in an easily accessible position, thanks to the presence of any quick-release joints 14.

We claim:

1. An alarm device for the protection from overheating of at least one primary catalytic converter mounted along an exhaust pipe of an internal combustion engine for conveying exhaust gases of the engine, said alarm device comprising:

at least one secondary catalytic converter installed in series along said exhaust pipe;

a temperature sensor supported by said secondary catalytic converter for detecting the internal temperature thereof; and at least one warning device adapted to be switched on when the temperature detected by said temperature sensor inside said secondary catalytic converter rises above a predetermined threshold temperature value;

said secondary catalytic converter being dimensioned smaller than the primary catalytic converter, said secondary catalytic converter being placed upstream to said primary catalytic converter in relation to the course of the exhaust gases and being designed to rise in temperature in response to the passage of the exhaust gases through the exhaust pipe in a manner proportional to the corresponding rising of temperature of said primary catalytic converter, wherein said secondary catalytic converter reaches said predetermined threshold temperature value and activates said at least one warning device prior to the primary catalytic converter reaching an overheating temperature at which the primary catalytic converter overheats.

2. The alarm device according to claim 1, wherein said secondary catalytic converter is connected to said exhaust pipe via rapid connection/disconnection joints and wherein said secondary catalytic converter is placed along said exhaust pipe in an easily accessible position, so as to allow a rapid and easy replacement of the secondary catalytic converter.

3. The alarm device according to claim 11, wherein said temperature sensor includes a thermocouple.

4. In combination, a vehicle having at least one primary catalytic converter mounted along an exhaust pipe of an internal combustion engine for conveying exhaust gases of the engine and an alarm device comprising:
- at least one secondary catalytic converter installed in series along said exhaust pipe;
- a temperature sensor supported by said secondary catalytic converter for detecting the internal temperature thereof; and
- at least one warning device adapted to be switched on when the temperature detected by said temperature sensor inside said secondary catalytic converter rises above a predetermined threshold temperature valve;
- said secondary catalytic converter being dimensioned smaller than the primary catalytic converter, said secondary catalytic converter being placed upstream to said primary catalytic converter in relation to the course of the exhaust gases and being designed to rise in temperature in response to the passage of the exhaust gases through the exhaust pipe in a manner proportional to the corresponding rising of temperature of said primary catalytic converter, said secondary catalytic converter reaching said predetermined temperature threshold and activating said at least one warning device prior to the primary catalytic converter reaching an overheat temperature at which the primary catalytic converter overheats, said temperature sensor being connected to a control system of said engine, said control system varying the operating parameters of the engine so as to reduce the emission of unburned substances when said threshold temperature value is exceeded.

5. The vehicle according to claim 4, wherein said primary catalytic converter consists of a catalytic muffler.

* * * * *